US008744711B2

(12) United States Patent
Heise et al.

(10) Patent No.: US 8,744,711 B2
(45) Date of Patent: Jun. 3, 2014

(54) BRAKE CONTROL DEVICE FOR DRIVING AND/OR CONTROLLING ACTUATORS FOR INFLUENCING A BRAKING FUNCTION OF A MOTOR VEHICLE

(75) Inventors: Andreas Heise, Erzhausen (DE); Christian Strehle, Frankfurt (DE)

(73) Assignee: Continental Teves AG & Co. oHG (DE)

( * ) Notice: Subject to any disclaimer, the term of this patent is extended or adjusted under 35 U.S.C. 154(b) by 188 days.

(21) Appl. No.: 13/000,757

(22) PCT Filed: Jun. 18, 2009

(86) PCT No.: PCT/EP2009/057621
§ 371 (c)(1),
(2), (4) Date: Dec. 22, 2010

(87) PCT Pub. No.: WO2010/000627
PCT Pub. Date: Jan. 7, 2010

(65) Prior Publication Data
US 2011/0098902 A1    Apr. 28, 2011

(30) Foreign Application Priority Data

Jul. 1, 2008  (DE) .......................... 10 2008 030 670
Jun. 17, 2009  (DE) .......................... 10 2009 025 674

(51) Int. Cl.
*G06F 7/70*       (2006.01)
(52) U.S. Cl.
USPC .......................................... 701/70; 303/113.1
(58) Field of Classification Search
USPC ........................... 701/70; 303/113.1, 20, 9.63
See application file for complete search history.

(56) References Cited

U.S. PATENT DOCUMENTS

| 4,418,963 | A | * | 12/1983 | Sprockhoff .................. 303/3 |
| 4,561,527 | A | * | 12/1985 | Nakamoto et al. ......... 192/219.4 |
| 5,139,315 | A | * | 8/1992 | Walenty et al. ............... 303/162 |
| 6,545,852 | B1 | * | 4/2003 | Arnold .......................... 361/160 |
| 2002/0175561 | A1 | * | 11/2002 | Jensen ..................... 303/113.1 |
| 2006/0279136 | A1 | | 12/2006 | Haeussler et al. | |
| 2007/0199773 | A1 | * | 8/2007 | Saito ........................... 188/72.1 |

FOREIGN PATENT DOCUMENTS

| DE | 43 42 871 A1 | 6/1995 |
| DE | 197 15 024 A1 | 10/1998 |
| DE | 101 22 954 A1 | 4/2002 |
| DE | 10 2004 015 447 A1 | 12/2004 |
| DE | 10 2004 008 935 A1 | 9/2005 |
| EP | 1 049 611 | 11/2000 |
| EP | 1 826 450 A2 | 8/2007 |
| EP | 1 916 168 | 4/2008 |
| WO | WO 99/48738 | 9/1999 |
| WO | WO 2004/108497 A2 | 12/2004 |

* cited by examiner

*Primary Examiner* — Helal A Algahaim
*Assistant Examiner* — Shardul Patel
(74) *Attorney, Agent, or Firm* — RatnerPrestia

(57) ABSTRACT

Brake control device for controlling actuators for influencing a braking function of a vehicle, including at least one logic circuit for controlling at least one braking function, wherein the control device controls at least one function of an electronic braking system and one parking brake function, wherein the brake control device includes electric power supply connections of at least the first kind and the second kind, wherein the first kind is connected to a reference potential and the second kind is connected to a different potential than the reference potential, and wherein the first kind or second kind is electrically connected to at least one functional element for controlling the electronic braking system and to at least one functional element for controlling the parking brake function, and/or is electrically connected to at least one functional element for controlling the electronic braking system and the parking brake function.

15 Claims, 4 Drawing Sheets

BRAKE CONTROL DEVICE FOR DRIVING AND/OR CONTROLLING ACTUATORS FOR INFLUENCING A BRAKING FUNCTION OF A MOTOR VEHICLE

CROSS REFERENCE TO RELATED APPLICATIONS

This application is the U.S. national phase application of PCT International Application No. PCT/EP2009/057621, filed Jun. 18, 2009, which claims priority to German Patent Application No. 10 2008 030 670.3, filed Jul. 1, 2008, and German Patent Application No. 10 2009 025 674.1, filed Jun. 17, 2009, the contents of such applications being incorporated by reference herein.

FIELD OF THE INVENTION

The invention relates to a brake control device for driving and/or controlling actuators for influencing a braking function of a motor vehicle.

BACKGROUND OF THE INVENTION

Electronic brake control devices for performing open-loop and/or closed-loop control of braking functions in a motor vehicle brake system such as, for example, an antilock braking function (ABS: Antilock Brake System) or a vehicle movement dynamics control function (ESC: Electronic Stability Control) are known per se, for example, from DE 101 22 954 A1, which is incorporated by reference. The specified document also discloses that the multiple embodiment of supply lines or connections for brake-by-wire control devices allows increased availability of energy supply of individual functions or of the overall function to be achieved in the case of faults on the supply lines.

However, electronic brake control devices are more widespread for conventional hydraulic, i.e. not brake-by-wire, brake systems which only comprise one connection for a positive supply line for the motor of a hydraulic pump, one connection for a further positive supply line for the electrohydraulic valves and, if it is not also supplied by the latter, a further connection for a positive supply line for the logic component (microcontroller etc.) of the control device. Furthermore, a connection for a ground line (GND) is generally present.

In addition to the electronic brake control devices for the service brake of a motor vehicle, electronic control units, which are disconnected from the brake control devices, for an electric parking brake are also known. For reasons of safety, these control units have, to a certain extent, one or more connections for positive supply lines. Corresponding control units are also known in which the ground supply line is also embodied multiply by corresponding ground connections.

The invention therefore relates to the object of making available an improved brake control device which combines both the functions of an electronic parking brake control unit which is known per se and the essential open-loop and/or closed-loop control functions of a service brake in a common device in such a way that advantages are obtained over control devices or control units which are respectively disconnected with respect to the functions.

SUMMARY OF THE INVENTION

This object is achieved according to aspects of the invention by means of a brake control device.

According to aspects of the invention, the brake control device, which is provided for driving and/or controlling actuators for influencing a braking function of a motor vehicle, comprises at least one logic circuit, for example having a redundant, in particular a multi-core, microcontroller, with which open-loop and/or closed-loop control is performed on at least one braking function.

The control device according to aspects of the invention is conceived as combination control device, that is to say for performing open-loop/closed-loop control of a plurality of vehicle function groups so that said control device comprises, or performs open-loop/closed-loop control on, at least one function of an electronic brake system and a parking braking function. By integrating two function groups or control systems into one control device, a saving is advantageously made at least in terms of the otherwise doubly used components and/or connections such as, for example, separate supply connections for supply lines (of a first or second type) or else in terms of the second logic circuit of the parking brake. A combination of the parking brake control unit with the brake control device to form an overall control device and therefore also the taking up of separate supply lines or separate supply connections of the two systems would, while maintaining the availability as for separate control devices or control units, give rise to extremely voluminous and therefore disadvantageous connection plugs for the overall control device. Furthermore, the presence of a plurality of GND connections, which supply only partial regions of the circuit when there is a simple combination, gives rise to considerable complexity of circuitry if loss of ground (GND loss) is to be detected.

According to aspects of the invention, the brake control device comprises electric supply connections of at least a first type and of a second type. In this context, the supply connection or connections of the first type is or are connected to a reference potential. At least one supply connection of the second type is connected to a potential which is different than the reference potential (or else a plurality of different potentials which are different from the reference potential). Furthermore, at least one supply connection of the first type or at least one supply connection of the second type is electrically connected, for supply purposes, (i) to at least one function element for driving and/or controlling the function of the electronic brake system and to at least one function element for driving and/or controlling the parking braking function, and/or (ii) to at least one function element for driving and/or controlling the function of the electronic brake system and the parking braking function.

That is to say the number of the supply connections of the first type is preferably lower than the number of the function groups which are normally present in the control device given a nonintegrated configuration, and/or the number of the supply connections of the second type is lower than the number of the connections required for a function group given a nonintegrated configuration.

A supply connection is preferably understood to be a contact point which is, in particular, led to the outside from the control device or an electric connector for a supply line or a contact terminal or a supply path.

The brake control device described above is advantageous because the number of supply connections and/or the required circuit elements is significantly reduced compared to a separate implementation of the at least two function groups (for example parking brake and service brake control system). The availability, for example in the event of a supply line being lost or a fault on one of the supply lines, compared to individual systems is at least the same or even higher. When a line is lost or there is a fault on one of the supply lines, the connection arrangement or line arrangement described above means that the control device never fails in its entirety but that rather only subfunctions possibly fail, those which relate to the provision of the power circuit of a number of functions, or an entire function group. The functionality of a logic component which is being used jointly with at least one power circuit of a function is, however, generally not affected when there is an individual line fault.

The control device preferably comprises active or passive electronic switching means for switching between individual supply connections within one type such as, for example, diodes, bipolar transistors, FETs or other electronic switches.

The brake control device is preferably provided for driving electric and/or electromechanical and/or hydraulic brake components. The brake control device serves for directly or indirectly driving and/or controlling at least one actuator such as, for example, at least one valve and/or an electric motor etc., for influencing the normal braking function or service braking function and the control functions (for example ABS control device or ESP control device) of a motor vehicle which are customary therein, which actuator also controls the driving of a parking braking function as well as influencing the service braking function. The parking braking function is implemented electromechanically and/or hydraulically here in a way which is basically known per se. The control device comprises one or more ground connections and one or more positive connections for the supply. In this context, at least one identical ground connection and/or positive connection is used to supply both the parking braking functions and the service brake control device functions. Failures of individual supply lines which are respectively connected to the connections either do not entail any failure of functions or subfunctions or only failures of subfunctions such as, for example, a normal braking function, ABS function or ESP function or parking braking function.

The brake control device comprises at least one logic circuit (for example the microprocessor of the brake system) which, according to a further preferred embodiment, is supplied via two or more supply connections of the second type so that in the event of failure of one of the supply lines which are connected thereto the logic circuit continues to be supplied.

The brake control device preferably also comprises at least one supply connection for the motor of a hydraulic pump which is additionally used as a supply connection for the electric or electrohydraulic parking brake, wherein, in particular in the event of failure of a supply line which is connected thereto, the parking brake is supplied via another supply path.

According to a further preferred embodiment of the brake control device, the supply connection of the electrohydraulic valves of the brake control device is simultaneously used as a supply connection for an integrated electric parking brake, wherein in particular in the event of failure of the supply line which is connected thereto the parking brake is supplied via another supply path.

According to a further preferred embodiment, the supply connection of the open-loop/closed-loop electronics of the brake control device is simultaneously used as a supply connection for an integrated electric parking brake, wherein in particular in the event of failure of a supply line which is connected thereto the parking brake is supplied via another supply path.

The at least one logic circuit (for example the central microprocessor) is preferably either supplied with voltage via at least two or three supply connections between which switching occurs as necessary (fault) actively (for example by means of active semiconductor components) or passively (for example with a diode arrangement), or by means of a continuous supply with at least two or three supply connections, in particular linked with an OR operation (for example by means of diodes).

According to a further preferred embodiment of the brake control device, said brake control device comprises high current paths which are connected to the supply lines or the corresponding supply connections of the second type and which supply the power components such as, for example, motors for the electromechanical or electrohydraulic parking brake, electromagnetic valves or the hydraulic pump of the brake system, wherein in particular redundant, electronic deactivation elements (main drivers and valve drivers) are provided within the control device, at least in one or more high current paths or in all the high current paths, in order, in the event of a fault in a path (for example in the event of a short circuit), to avoid adversely affecting or preventing the function of another supply path. By switching off the faulty path the operation of the nondefective component can therefore be maintained. In many cases, it is particularly advantageously possible for already present active components of the electronic function group which is to be deactivated to be used to deactivate the faulty path. This is possible, for example, when using an H bridge, which is known per se, for motor driving with three phases.

The brake control device preferably comprises at least two ground supply connections or ground supply paths, each of which is sufficiently dimensioned in terms of the current carrying capacity that the entire control device can be sufficiently supplied in the permissible supply voltage range. This means that it is possible that one of the ground supply connections or paths permits the full availability only for a limited time or else only allows availability of the control device or the function component or components (for example braking function or parking braking function as well as the driving thereof) with functional restrictions.

Preferably, when there is shedding or a disconnection of a ground line which is connected to one of the connections described above, the remaining ground connection or connections assumes/assume the functionality in such a way that no functional restrictions, or no significant functional restrictions, of the control device occur. As a result, loss or disconnection of a ground line in the exemplary control device cannot be, or does not have to be, necessarily detected. Within the brake control device, the ground connections in the control device are expediently connected to one another via electronic power components such as, for example, diodes, antiparallel diodes, semiconductor switches, FETs or ohmic resistors, particularly expediently low impedance resistors or specially configured or constructed resistance conductor tracks. It is particularly expedient if the voltage drop at one or more of these connecting power components is used to detect a fault within the power supply.

The control device also preferably comprises a detection circuit which is integrated, in particular, into a connection multiplexer which is described further below and with which a disconnection in one or more supply lines of the first or second type is detected. In the case of connecting power switches such as FETs it has proven particularly appropriate to connect said power switches in a selective fashion to the detection circuit in such a way that faults in the voltage supply become detectable.

The principle described above of connecting the ground connections to the electronic power components defined above or else resistance conductor tracks can, according to a further or alternatively preferred embodiment, also be applied to the supply connections of the second type with a positive reference potential. Accordingly, the corresponding positive connections in the control device are connected to one another, for example, by means of diodes, antiparallel diodes, semiconductor switches, FETs or ohmic resistors, in particular correspondingly configured conductor tracks.

By means of the separate testing device, it is expediently also possible here to use the respectively measured voltage drop at these power components to detect faults in the supply or switches or power switches can be selectively switched in such a way that faults can be detected in the supply.

According to one particularly preferred embodiment, the ground supplies in the control device are connected directly to one another, that is to say without connecting components.

According to one quite particularly preferred embodiment, the supply connections of one type are not connected to one another by electronic power components but rather by electronic low-power components which cannot permanently conduct the load current of a power consumer and would be overloaded by the current. The possible or permissible current through the low-power components is, however, nevertheless sufficient to supply the at least one logic circuit.

The brake control device can advantageously be constructed in such a way that when a failure of a supply line is detected (for example disconnection of the fuse or of the line) the functionality of the control device is entirely or partially maintained. It is expedient to output a failure or a defect in a supply line from the control device as a fault (for example in order to warn a driver) even when the functionality of the control device is fully maintained. The outputting of the fault can be passed on to the driver and/or to a device for storing a fault. The device for storing the fault is preferably configured in such a way that the fault can be additionally or exclusively read out during a visit to a workshop.

Alternatively, but in particular additionally, it is expediently possible to display the fault to the driver and/or a storage and reading means is provided which permits fault information to be read out during a visit to a workshop.

It is particularly advantageous if the brake control device is configured in such a way that when a failure is detected in a supply line (for example disconnection of a fuse which is arranged in the path, or of the line itself) the full functionality of the control device is initially maintained with or without a driver display or storage of a fault, and then in particular incremental functional degradation (for example deactivation of the traction control system functionality, of the ESP functionality etc.) is implemented with the objective of allowing the driver to operate at least for some time with the comfort functions or control functions, at least until a workshop is reached, or alternatively or additionally of outputting a driver signal (for example a service interval display) which appears in particular whenever the vehicle is restarted.

According to a further preferred embodiment, the brake control device comprises a connection multiplexer which disconnects a supply path from supply connections of the first or second type and/or connects said supply path to these supply connections and/or performs distribution of the current among the remaining available supply connections of one type. In the simplest case, according to one particularly expedient embodiment, the connection multiplexer is merely an arrangement of diodes and/or resistors, in particular conductor track sections, with nonswitched distribution of the current among the corresponding supply connections.

According to a further preferred embodiment, the ground supply line outside the control device is of multiple design in the form of one or more individual lines which are led to separate ground connections of the control device, but the line paths to the separate ground connections within the control device are combined again to form a relatively small number of line paths, generally a common ground path. This can expediently be carried out by means of the already mentioned electrical OR connection. It is advantageously frequently possible to dispense with a redundant supply within the control device owing to the considerably rarer ground faults.

Both the supply connections of the first type and the supply connections of the second type are preferably embodied at least with single redundancy (double or multiple).

BRIEF DESCRIPTION OF THE DRAWINGS

The invention is best understood from the following detailed description when read in connection with the accompanying drawings. Included in the drawings is the following figures.

In the drawings.

DETAILED DESCRIPTION OF THE PREFERRED EMBODIMENTS

Figure 1:
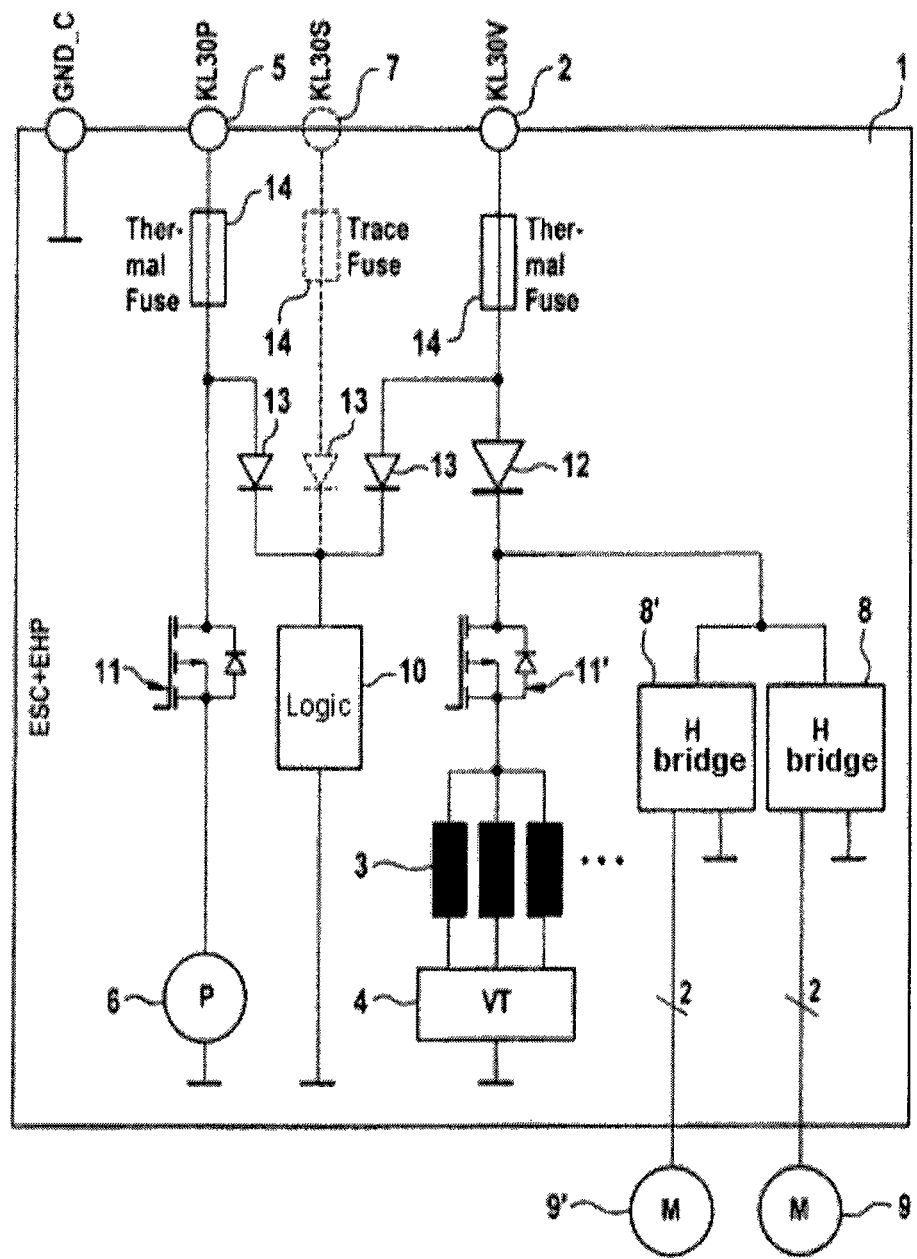
FIG. 1 shows a brake control device with integrated driving and redundant logic (positive) supply for a parking brake with a common ground connection.

FIG. 1 shows an ESC control device 1 with integrated driving of the parking brake with a KL30V positive supply line 2 for supplying electromagnetic hydraulic valves of an electrohydraulic brake system (valves 3 and valve drivers 4) and simultaneous supply of an electric or electrohydraulic parking brake, comprising, inter alia, two H bridges 8, 8' and two parking brake motors 9 and 9' arranged outside the control device. The reference potential GND_C is used commonly and is therefore configured in such a way that the current can be carried permanently for both braking functions.

The voltage supply for the logic circuits 10 is provided redundantly from KL30P 5 and KL30V 2. The dotted connection to KL30S 7 represents an optional possibility of a logic supply with triple redundancy, wherein in principle any desired coupling of the three connections 5, 2 and 7 to the logic circuit 10 is possible if in the process at least two of these connections are coupled in order to form redundancy. The supply of the commonly used logic circuit 10 is therefore embodied with double or triple redundancy. The logic circuit 10 contains an at least partially digital circuit with, in particular, a digital computing unit, for performing open-loop/closed-loop control of the braking function and the parking braking function. Supplying the supply currents from the terminals KL30P, KL30V or optionally KL30S via diodes 13 results in a connection of the supply paths with an OR operation in such a way that in the event of a failure of a path the remaining path or the remaining paths can supply the logic 10 alone.

The power supply paths to which a positive potential is applied at terminals KL30P (pump) and KL30V (valves) expediently contain electronic protection components 14. For this purpose, thermally triggering protection components, for example fusible bridges (no triggering when there is an overcurrent within the customary limit) have proven particularly suitable, said protection components bringing about, in contrast to conventional fuses, a disconnection of the power supply line when the temperature of the printed circuit board (for example in the event of burning out of a printed circuit board) is exceeded to a very high degree.

Figure 2:
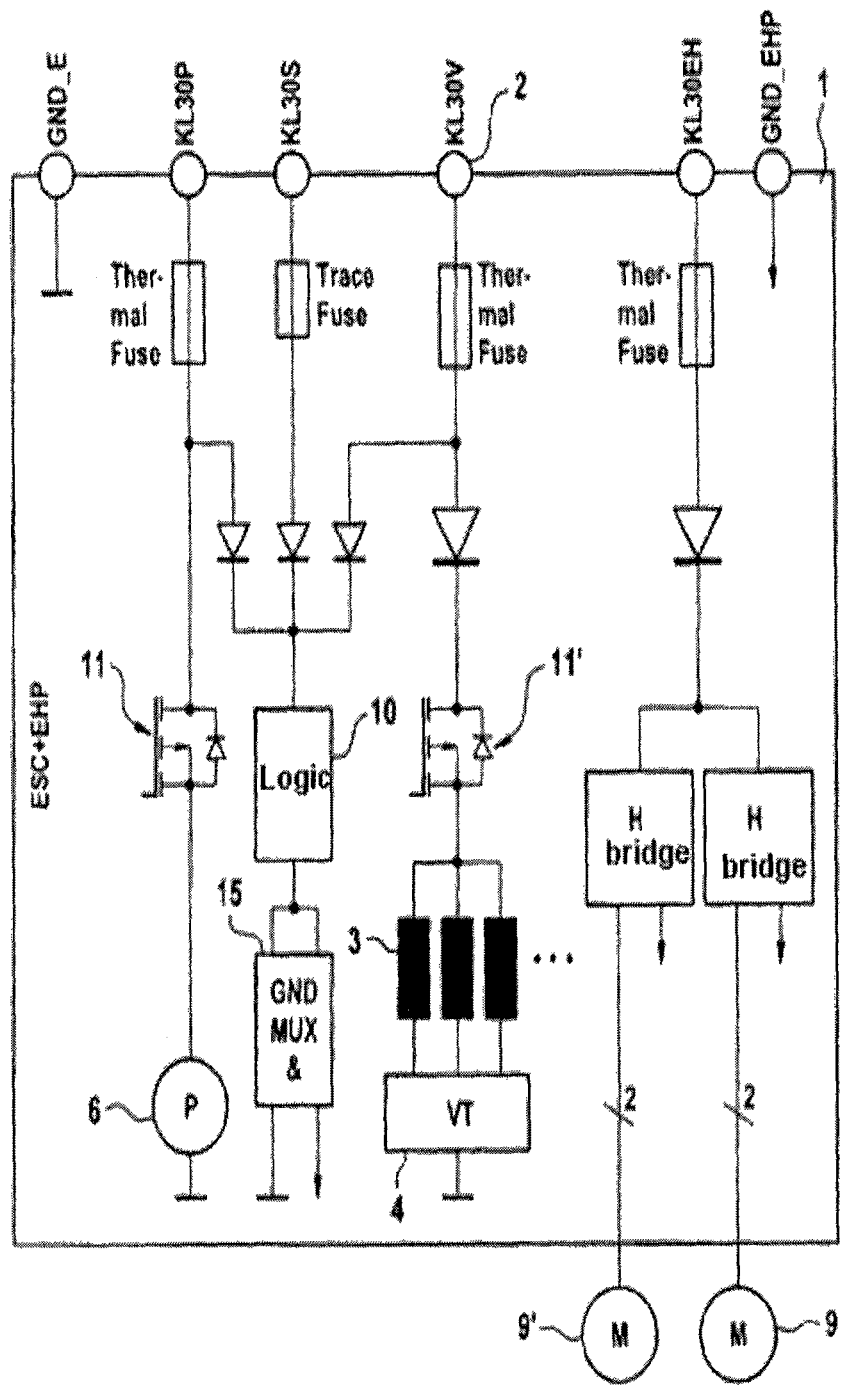
FIG. 2 shows a control device corresponding to FIG. 1 but with two ground connections and a ground multiplexer for switching in the event of a loss of a ground line and separate positive supply connections for all the functional elements.

FIG. 2 shows a brake control device in which the GND supply of the control device 1 is separated via connections GND_EHP (for EHP) and GND_E (for the brake system). Both ground connections are configured for conveying high currents. The supply of the logic 10 is also carried out here redundantly via control-device-internal linking of the two ground connections GND_EHP and GND_E (also optionally via connection KL30S).

In the event of a fault on a GND supply GND_E or GND_EHP, either just one circuit component (ESC or the parking brake) fails, but the logic 10 which is used jointly continues to be supplied or the remaining ground is distributed to all the circuit components through a connection multiplexer 15 (GND MUX). The disconnection of a ground connection is, however, detected by the connection multiplexer 15 and output as a fault signal.

The supply of the parking brake actuator system with a positive voltage is carried out in the circuit in FIG. 2 via a separate power path which is connected to terminal KL30EH.

The connection multiplexer 15 can alternatively or jointly be used for the logic supply. The connection multiplexer 15 is, for this purpose, connected to the logic 10 and to the two grounds GND_E and GND_EHP, it being possible, where necessary, to arrange said connection multiplexer 15 in the power path so that a power ground supply (distribution)—which can, under certain circumstances, only be detected provisionally or completely—of the respective other power path (ESC or electrohydraulic parking brake) is made possible.

Figure 3:
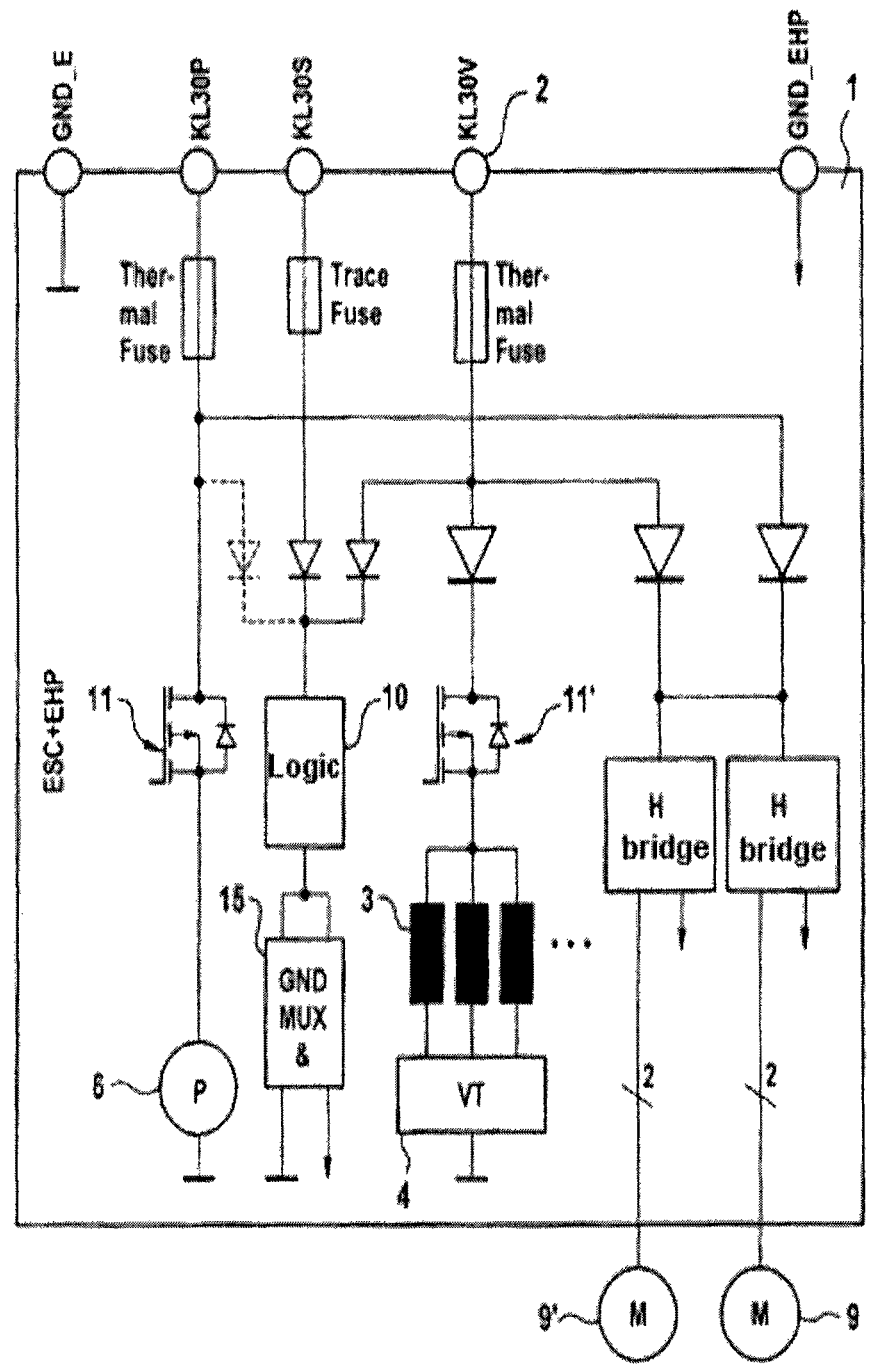
FIG. 3 shows a control device corresponding to FIG. 2 with a number of positive supply connections which is reduced compared to FIG. 2 but with redundant supply of the logic and the driving of the parking brake.

FIG. 3 shows a brake control device with the KL30V and KL30P power supplies which are customary for ESC brake control devices. According to the exemplary embodiment illustrated here, the parking brake power supply is therefore provided from more than one power supply line of the brake control device (for example the valve supply and pump supply) so that despite a reduced number of terminals an additional redundant supply of the parking brake is also maintained here.

The ground supply is, as in FIG. 2, embodied separately via connections GND_EHP for the parking brake and GND_E for the brake system. As in FIG. 2, a connection multiplexer 15 (GND_MUX) which is connected to the two ground connections GND_E and GND_EHO is alternatively or jointly provided for supplying the logic 10. There is also alternatively the possibility here of arranging the connection multiplexer 15 in the power path.

Figure 4:
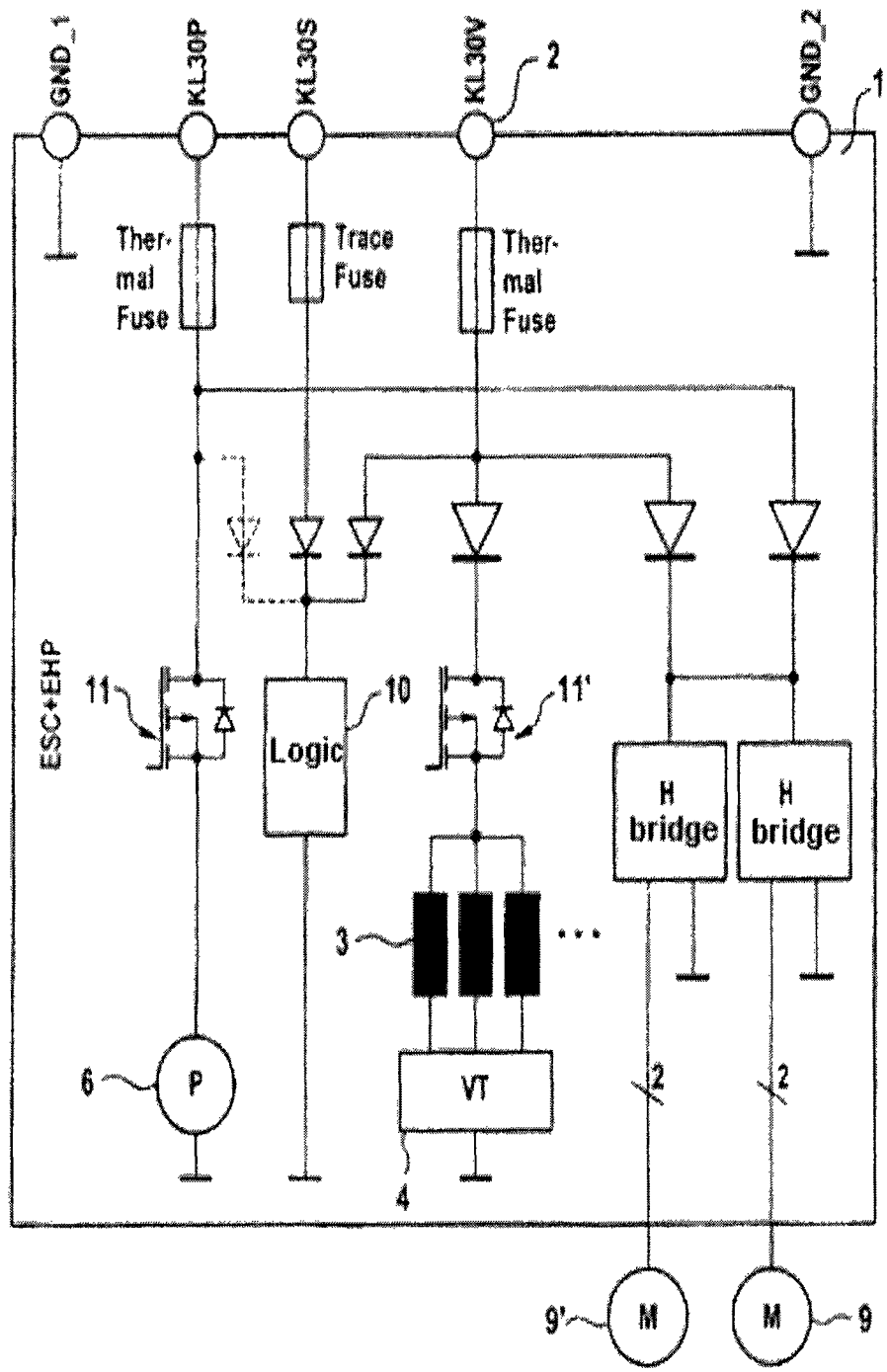
FIG. 4 shows a control device corresponding to FIG. 3 with two high current ground connections without a detection circuit for an individual ground line disconnection with redundant logic supply and redundant driving of the parking brake.

FIG. 4 corresponds largely to the brake control device in FIG. 3, with two ground connections GND_1 and GND_2 which are equivalent, and therefore completely redundant, in terms of the current carrying capacity being provided here, said ground connections GND_1 and GND_2 also permitting unrestricted operation of the entire system with just one ground connection. In the interior of the control device, the ground connections are connected at low impedance to form a common internal ground path. In a circuit according to the present exemplary embodiment, it is not readily possible to detect a ground disconnection, but this is not absolutely necessary for the safe operation of a circuit, as is presented here, owing to the sufficient configuration of the two ground connections.

The invention claimed is:

1. A brake control device for controlling a braking function of a motor vehicle brake, said brake control device comprising:
   a logic circuit which performs at least one of open-loop control and closed-loop control on the braking function of both an electro-hydraulic brake and a parking brake of the motor vehicle; and
   a parking brake circuit which is controlled by the logic circuit to control the braking function of the parking brake,
   wherein the logic circuit is powered by a plurality of independent power lines protected from each other by restricting electrical current flow between the plurality of independent power lines, the parking brake circuit is powered by at least one of the independent power lines, and the electro-hydraulic brake is powered by at least one of the independent power lines.

2. The brake control device as claimed in claim 1, wherein a supply connection having a potential different than the power lines is connected to electric supply paths on a conductor track carrier of the brake control device, wherein said supply paths comprise at least one high current supply path for supplying a load and one low current supply path for supplying at least one logic circuit.

3. The brake control device as claimed in claim 1 further comprising at least two power lines or at least two supply connections having a potential different than the power lines.

4. The brake control device as claimed in claim 1, wherein the logic circuit performs at least one of open-loop control or closed-loop control both on the function of the electronic brake system and on that of the parking braking function.

5. The brake control device as claimed in claim 1, wherein the logic circuit is supplied via two or more supply connections having a potential different than the power lines so that, in the event of failure of one of the supply lines which are connected to the connections, the logic circuit continues to be supplied.

6. The brake control device as claimed in claim 1, wherein the brake control device comprises at least one supply connection for the motor of a hydraulic pump of a service brake, wherein said at least one supply connection is additionally used as a supply connection for the electric or electrohydraulic parking brake or drive elements thereof,
   wherein, in the event of failure of a supply line which is connected to the electric or electrohydraulic parking brake or drive elements thereof, the parking brake or the drive elements thereof are supplied via another supply path.

7. The brake control device as claimed in claim 1, wherein the brake control device comprises at least one supply connection for electromagnetic valves of a service brake, wherein said at least one supply connection is additionally used as a supply connection for the electric or electrohydraulic parking brake or the drive elements thereof,
   wherein, in the event of failure of a supply line which is connected to the electric or electrohydraulic parking brake or the drive elements thereof, the parking brake or the drive elements thereof are supplied via another supply path.

8. The brake control device as claimed in claim 1, wherein a supply connection of open-loop/closed-loop electronics of a service brake is simultaneously used as a supply connection for an integrated electric parking brake or the drive elements thereof, wherein, in the event of failure of a supply line which is connected to the integrated electric parking brake or the drive elements thereof, the parking brake or the drive elements thereof are supplied via another supply path.

9. The brake control device as claimed in claim 1, wherein the at least one logic circuit is supplied with voltage either via at least two supply connections between which switching over of the supply is performed in the event of a fault, or continuous supply of the logic circuit occurs via at least two supply connections.

10. The brake control device as claimed in claim 9, wherein the at least two supply connections are linked by a logic OR.

11. The brake control device as claimed in claim 1 further comprising at least two ground connections or ground paths, each of which has a current carrying capacity to supply the control device in a permissible supply voltage range.

12. The brake control device as claimed in claim 1 further comprising high current paths which are connected to the supply connections having a potential different than the power lines and which supply power components.

13. The brake control device as claimed in claim 12 further comprising redundant, electronic deactivation elements provided within the control device in one or more high current paths or in all the high current paths.

14. The brake control device as claimed in claim 1 further comprising a connection multiplexer which disconnects a supply path from ground connections or connects said supply path to different ground connections or carries out distribution of current among remaining available ground connections.

15. The brake control device as claimed in claim 14 further comprising a detection circuit in the connection multiplexer, said detection circuit being configured to detect a disconnection in one or more supply lines at the connections of the power lines or supply connection having a potential different than the power lines.

* * * * *